United States Patent [19]

Garrett et al.

[11] 4,051,937

[45] Oct. 4, 1977

[54] HYDRAULIC CLUTCH RELEASE MECHANISM FOR MOTOR VEHICLES

[75] Inventors: Roy Peter Garrett, Luton; Derek Ray Parkins, Dunstable, both of England; Manfred Brandenstein, Aschfeld; Armin Olschewski, Schweinfurt, both of Germany

[73] Assignee: SKF Industrial Trading and Development Company B.V., Amsterdam, Netherlands

[21] Appl. No.: 652,244

[22] Filed: Jan. 26, 1976

Related U.S. Application Data

[62] Division of Ser. No. 349,298, April 9, 1973, abandoned.

[51] Int. Cl.² ............................................. F16D 25/08
[52] U.S. Cl. ........................... 192/88 A; 192/85 CA; 192/91 A; 192/110 B; 92/100; 308/26
[58] Field of Search ............ 192/85 CA, 91 A, 110 B, 192/88 A; 92/100; 308/26

[56] References Cited

U.S. PATENT DOCUMENTS

| | | | |
|---|---|---|---|
| 2,809,308 | 10/1957 | Turner | 192/85 CA |
| 3,122,895 | 3/1964 | Woods | 192/85 CA |
| 3,250,353 | 5/1966 | Liszewski et al. | 192/85 CA |
| 3,429,410 | 2/1969 | Hansen | 192/85 CA |
| 3,695,407 | 10/1972 | Peery | 192/85 CA |

FOREIGN PATENT DOCUMENTS

| | | | |
|---|---|---|---|
| 302,252 | 10/1954 | Switzerland | 192/85 CA |

*Primary Examiner*—Benjamin W. Wyche

[57] ABSTRACT

A hydraulic release mechanism for automotive clutches and the like comprising a housing and a bearing assembly. The assembly comprises a non-rotating race ring, a rotatable race ring adapted to be connected to an operating element for said clutch and a plurality of rolling elements arranged therebetween. The bearing assembly is mounted with respect to the housing for axially slidable movement and radially floating movement. The housing under pressure, the force of which is transmitted through the end of the non-rotating race ring, the rolling elements, and the rotating race ring to the clutch operating element. Preferably, the means for mounting the bearing assembly with respect to said housing comprises a flexible bellows.

6 Claims, 7 Drawing Figures

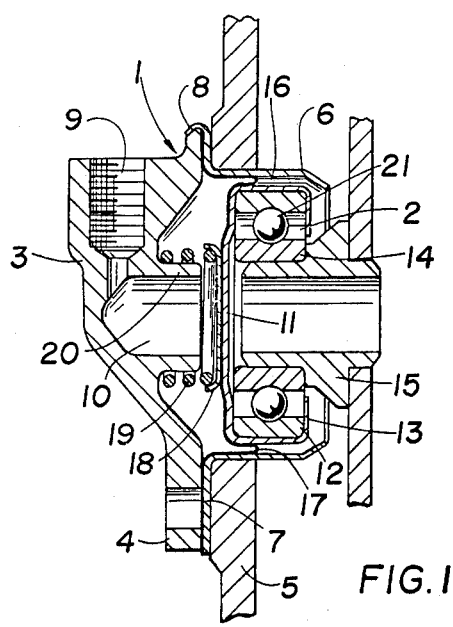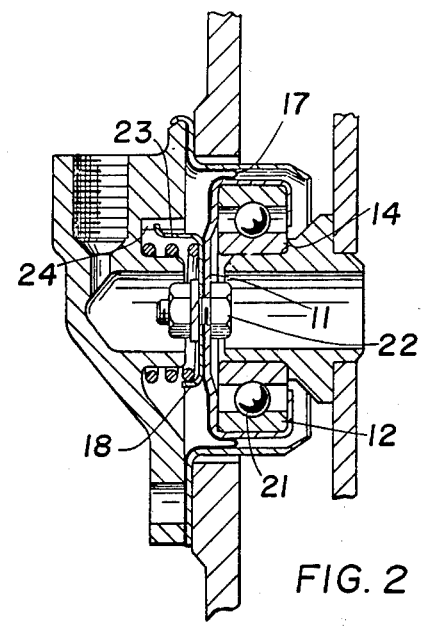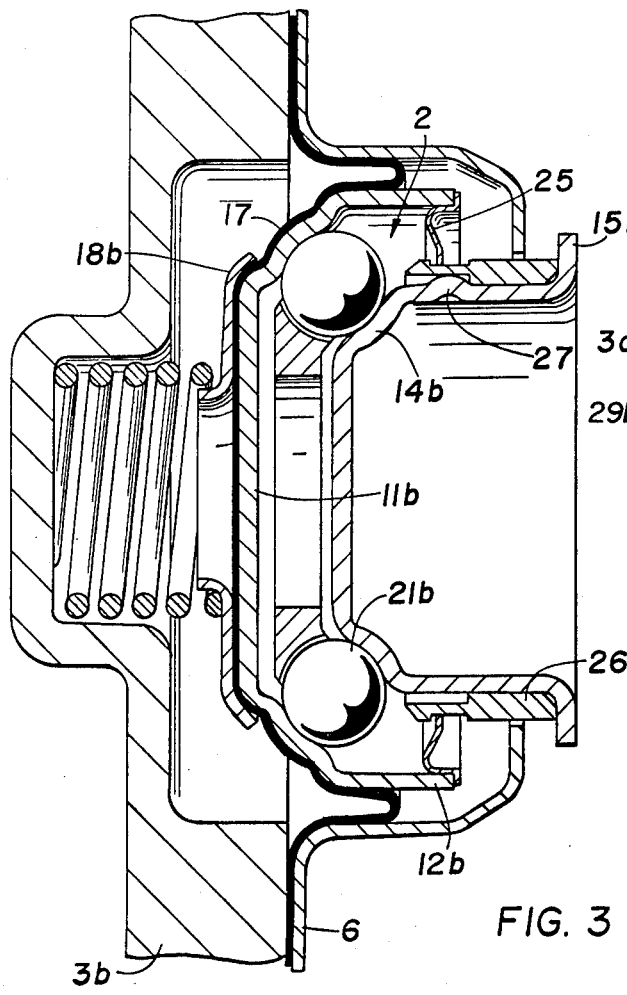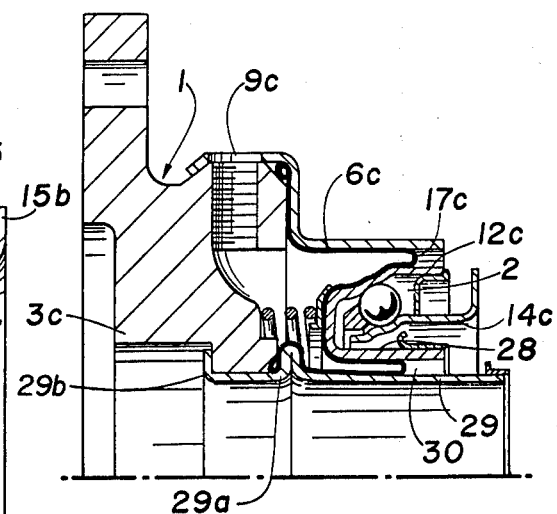

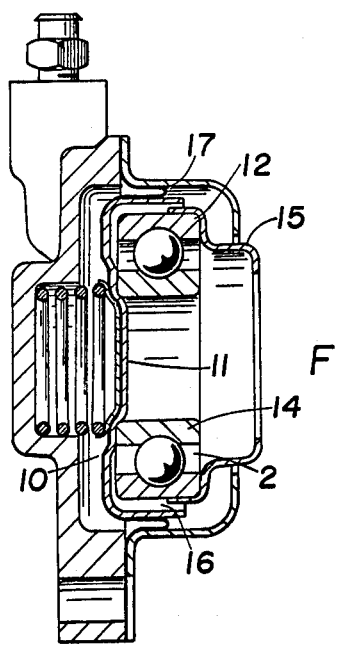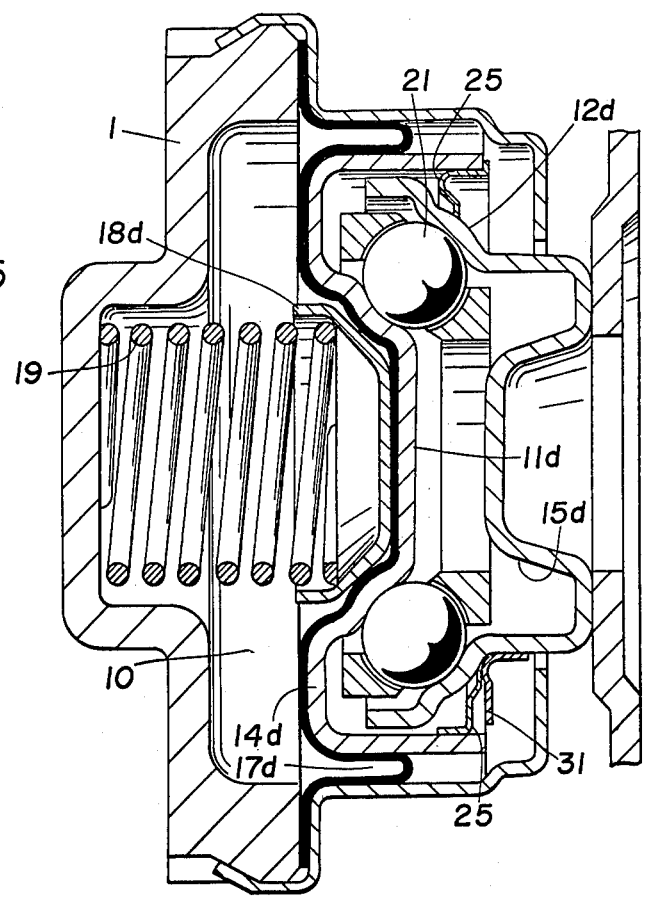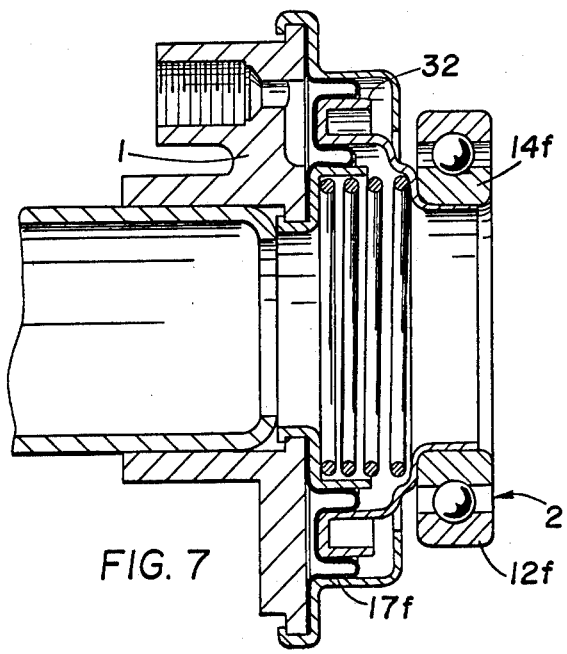

HYDRAULIC CLUTCH RELEASE MECHANISM FOR MOTOR VEHICLES

This is a Divisional Application of Ser. No. 349,298, filed Apr. 9, 1973, and now abandoned.

BACGROUND OF INVENTION

The present invention relates to a hydraulically operable release mechanism for clutches particularly adapted for motor vehicles and the like.

A release mechanism for automotive clutches is shown in German patent publication DOS2,003,253. In this known device a bearing assembly comprising an inner and an outer ring is mounted so as to be axially slidable within a cylindrical housing. The inner ring is extended so as to form a piston with respect to the cylinder so that on introduction of a pressure medium into the cylinder the inner ring is movable. The piston formed on the inner ring is provided with piston rings or the like which slidable engage against the inner face of the bore of the cylinder and seal the same. In order to remove or accommodate small misalignment and mounting in accuracy, the bearing of the release mechanism is made to be deflected in a small angular direction. Deflection, however, in a gross radial direction is however not possible. The known release mechanism therefore has the disadvantage that its inability to deflect radially prevents it from being truly and precisely alignable and prevents it from being used in many installations wherein radial movement is necessary in order to maintain the bearing constantly operable.

It is an object of the present invention to provide a hydraulic release mechanism for automotive clutches which overcomes the difficulties of the prior devices.

It is a further object of the present invention to provide a hydraulic release mechanism for automotive clutches which is compact and which may be formed of a unitary assembly.

It is a further object of the present invention to provide a hydraulic release mechanism for automotive clutches which is constructed so as to have an adjustable movement in the radial direction without there existing the possibility that the piston member or its equivalent member will bind or clamp with the housing.

It is a further object of the present invention to provide a hydraulic release mechanism for automotve clutches in whcih the bearing is maintained in respect to a housing which is provided with effective friction free and wear resistant sealing means for the pressure medium chamber. These objects, as well as additional objects and advantages are set forth in connection with and in the body of the following disclosure of the present invention.

SUMMARY OF THE INVENTION

According to the present invention a hydraulic release mechanism for automotive clutch means or the like is provided comprising a housing and a bearing assembly arranged in connection therewith. The bearing assemly comprises a non-rotating race ring, a rotatable race ring adapted to be connected to an operating element for the clutch and a plurality of rolling elements arranged therebetween. Means provided for mounting the bearing assembly with respect to the housing so that the bearing assembly is axially slidable and has a floating movement with respect to the housing which permits a significant degree of radial play. the housing and the bearing define a chamber for receiving fluid under pressure the force of which is transmitted through the end of the non-rotating race ring, the rolling elements and the rotating race ring to the clutch operating element. The release mechanism of the present invention distinguishes primarily from the release mechanisms of the prior art in that in addition to the slidable movement of the bearing assembly the bearing assembly has the significant amount of radialy play to over come the disadvantages of the prior art. Because of the floating arrangement of the bearing of the release mechanism the bearing assembly can be deflected in the radial plane from that of the housing so that the bearing itself can be automatically centered with respect to its own load. In this manner misalignment along the axis between the clutch and the release mechanism can be compensated for or entirely eliminated.

In an embodiment of the present invention the housing is provided with a cylindrical portion in which the bearing assembly is located. The bearing assembly has an outer diameter substantially less than the inner diameter of the cylindrical portion and the annular space between these two surfaces is closed by an elastic flexible bellow member. In general the known constructions of release mechanism contain one or more slidable seal rings or members. On the contrary, according to the present invention, these slidable ring seal members are replaced by a friction free seal, without thereby reducing the quality of the seal. This construction furthermore provides a more reliable and a guaranteed effective seal for the pressure media admitted into the housing and one which has a longer life span.

In a further embodiment of the present invention the bore or central opening of the bearing assembly of the release mechanism is provided with a cover plate over its frontal end on the pressure side. The cover plate may be abutted against or made as one piece with the end of the inner or outer ring. An advantage of this construction lies in the fact that a more effective sealing of the housing portion in which the pressure medium is admitted is more easily provided. The release mechanism built in accordance with this embodiment is advantageously used in connection with the clutch for motor vehicle wherein the motor is transversely arranged to the direction of travel and the transmission itself is arranged laterally from the motor since by this construction no shaft need be extended and driven through the release mechanism itself.

The simple form of a bellows and an uncomplicated securement of the bellows is provided by another form of the present invention. Here the elastic bellows is secured at its outer edge to the housing while its inner edge is secured at least in part over the cover plate for the bearing assembly. In order that the surfaces of the races are maintained in constant contact with the rolling elements, spring means may be provided which are arranged between the wall of the housing and a pressure disc lying against the bearing assembly opposite thereto. The pressure disc helps maintain the flexible bellows in position. Further, the cover plate and the pressure disc can be connected or fastened together by a bolt or similar screw means to hold the same together and to clamp the inner edge of the bellows therebetween. Furthermore, means are provided to extend radially from the pressure disc into a axially running groove formed in the inner wall of the housing so that angular movement of the assembly and the bellows can be prevented.

A further advantage arises from the present invention when the operating element for the clutch mechanism is secured to the rotating bearing ring or is made unitarily therewith. Lastly, an advantage is obtained in accordance with the present invention by providing seal means on the outer end of the bearing assembly, i.e,: the end of the assembly from which the operating element extends, which seal means is arranged between the inner and outer rings of the bearing and maintains these rings in a spaced non-touching relationship.

Full details of the present invention are found in the following description of the preferred embodiments and in the accompanying drawings.

BRIEF DESCRIPTION OF THE DRAWINGS

FIG. 1 is a sectional view of a release mechanism in accordance with the present invention taken through its central axis;

FIG. 2 is a view similar to FIG. 1 showing another embodiment of the present invention;

FIG. 3 is a view similar to the preceding views showing still a third embodiment;

FIG. 4 is a sectional view taken above the axis of the release mechanism showing still a fourth embodiment;

FIG. 5, 6 and 7 are each sectional views similar to the preceding views showing still further embodiments of the present invention respectively.

DESCRIPTION OF INVENTION

Before turning to the present invention reference is made to co-pending application, Ser. No. 349,456 filed on even date hereof, now abandoned and assigned to the assignee of the present invention. In the co-pending application a hydraulic release mechanism is shown wherein the hydraulic force for operating the same is transmitted through the non-rotating race ring of the bearing assembly, the rolling elements, and the rotating race ring which is adapted to be connected to the operating element of the automotive clutch. Various aspects of the structure of the housing operating element, clutch and general form of the release mechanism may be similar to that of the present application and reference may be made to the co-pending application as if that application were more fully set forth herein.

Turning to FIG. 1 of the drawings, a hydraulic release mechanism is shown comprising a two part housing generally depicted by the numeral 1 and a release bearing assembly generally depicted by the numeral 2. The housing 1 comprises a rear housing portion 3 which is provided with a flange 4 which can be fastened by suitable bolt or screw or other screw means to the transmission or clutch housing depicted generally by the numeral 5. The housing 1 is further formed of a substantially cylindrical sheet metal portion 6 which has a radially outward extending flange 7 which is clamped between the frontal end of the housing portion 3 and the transmission or clutch housing 5. The flange 7 is formed with a bent over peripheral edge 8 which fastens itself over the peripheral edge of the housing portion 3. A tap hole or bore 9 is drilled in the rear portion 3 of the housing 1 and serves to secure a suitable conduit or line by which pressurized media, or fluid such as suitable hydraulic oil can be fed to the interior of the housing. The tap 9 communicates with a central chamber 10 formed along the axis of the release mechanism. The bearing 2 of the release mechanism is a more or less conventional radial ball bearing. The bore of the bearing assembly is provided with a cover plate 11 which extends over the end of the bearing assembly on the side facing the pressure chamber 10. The cover plate 11 is formed of a sheet metal and is conveniently made by pressing, stamping or other nonmachining means. The cover plate 11 is bent over to fit about the edge of the outer ring 12 and to fit about the outer face of the outer ring 12 of the bearing assembly. The cover plate is further bent over in a radially inwardly directed annular flange-like portion 13 so that the cover member closes and seals the bearing assembly 2. The inner ring 14 of the bearing assembly 2 is provided with a bore into which a shaft-like operating element 15 is press fit. Situated at the outer end of the operating element shaft 15 can be the thrust discs or pressure plates of the clutch assembly.

The outer diameter of the bearing assembly 2 is substantially smaller than the inner diameter of the substantially cylindrical housing portion 6 so that a relatively wide annular space 16 is provided which would allow the bearing assembly to have a significant radial and angular area of movement so that the operating element 15 can be adjusted and centered within a wide range. This space 16 and consequently the chamber 10 to which the pressure medium is admitted is closed and sealed by a flexible elastic bellows 17. The bellows is formed from a reinforced natural or synthetic rubber which may be vulcanized, plastic or synthetic material or a similar material suitable for such use. The bellows 17 has a normally enlarged radial extent and covers the covering plate 11 as well as a portion of the outer ring 12 of the bearing assembly and extends radially outward to be clamped between the housing portion 3 and the flange 7 of the cylindrical sheet metal portion 6 of the housing. Lying on top of the central portion of the bellows 17 is a pressure plate 18 which is biased by a spring 19 secured about an annular post 20 extending inwardly from the rear face of the housing 1. The spring 9 forces the pressure disc 18 against the bellows 17 clamping the bellows between it and covering disc 11. When the whole assembly is not yet installed the spring 19 further normally urges the bearing assembly outwardly of the cylindrical housing portion 6, to the right as seen in FIG. 1, however the free end of the cylindrical housing portion 6 is slightly bent radially inward so as to engage the bearing assembly 2 preventing it from being totally pushed out of the housing 1.

The release mechanism of the present invention functions to release or switch the clutch when a hydraulic fluid media is delivered to the chamber 10 under pressure. The pressure media acts against the bearing assembly and particularly against the cover plate 11 which encloses the chamber 10. The force of the pressurized media is therefore transmitted against the non-rotating outer ring 12 and subsequently through the rolling elements 21 arranged between it and the inner race ring 14. The inner race ring 14 to which the operating element 15 is connected is also urged under the action of the pressure medium to the right as seen in FIG. 1. As a result the combined bearing assembly 2 functions as a piston arranged within the housing an instantaneously moves the operating element 15 which may then engage the release lever or similar mechanism in the clutch to thereby disengage the clutch.

In FIG. 2 a hydraulic release mechanism for automotive clutches similar to that shown in FIG. 1 is also depicted, differing only in the form and mounting of the pressure plate 18 holding one end of the spring 19. Under certain circumstances during the releasing operation of the mechanism, the rubbing of the rolling elements 21 transmit a slight turning moment from the rotating inner ring 14 to the non-rotating outer ring 12 which moment is transmitted undesirably to the bellows 17. The bellows 17 is thus placed under a slight shearing load. In order to prevent the movement of the bellows 17 with the movement of the outer ring and thus to prevent any shear forces, the cover plate 11 fastened to the outer ring 12 is connected with the pressure plate 18 by means of a bolt 22. The pressure plate 18 is provided with an axially extending finger or tab 23 which extends within a groove 24 axially extending in the inner face of the housing 21. By this expedient the possibility of rotating the pressure plate 18 and conjointly therewith the shearing of the bellows 17 is effectively prevented. By the bolt connection between the pressure plate 18 and the cover plate 11, the outer ring 12 is also prevented from rotating or precessing with the inner race ring 14.

In FIG. 3 another embodiment is shown which while the structure of the bearing assembly 2 differs from that of FIG. 1 leans heavily on the principle of FIG. 1 for its mounting. In FIG. 3 the bearing assembly is formed as an angular contact ball bearing in which the inner ring 14b and the outer ring 12b are made from non-machined sheet metal or the like pressed, stamped or otherwise formed into conforming cup or bowl shaped members. The bowl shaped members are unitary in construction and for example the outer race ring 12b unitarily includes as a single integral member the cover plate 11b while the inner race ring 14b also includes a corresponding enclosing cover member situated along the axis of the bearing as well as the clutch operating element 15b which is formed as a radially outwardly extending flange integral with the inner race ring 14. The race surfaces against which the balls 21b contact are inclined to the axis of rotation and the balls are held by a conventional cage mechanism. The clutch operating element 15b is adapted to engage with a release lever extending from the clutch itself and thus need not be aligned axially with the lever and/or the clutch. As in FIG. 1 the housing is again formed of two parts, the rear part forming the pressure chamber into which a tap bore, not shown in FIG. 3, extends for the conduction of the fluid media, and a forward sheet metal portion which extends about the bearing assembly. The bellows member is clamped between the two housing portions along its outer periphery and between the cover plate 11b and the pressure disc 18b which is pressed and shaped to conform to the cover plate. By this construction many advantages are obtained. On the one hand the rotating inner race ring is itself enclosed. It is made of lightweight material, and its symmetrical in nature makes it very stable, all of which contribute to a reduction in vibration or oscillation and a lowering in the production of noise. On the other hand the interior of the bearing itself is effectively sealed by both the covering plate 11b and the covering member of the inner race ring 14b so that the entry of dirt, dust or other impurities can be effectively prevented.

The above advantages are further enhanced by providing at the free end of the outer ring 12 an annular angular ring 25 which extends towards a counterring 26. The counterring 26 is axially elongated and is shoved over the outer surface of the inner ring 14 to lodge between the inside face of the operating element 15b and one or more radially extending nodes or detents 27. The angular ring 25 and the counterring 26 form together and cooperate together to form a non-engaging rotating seal. With this inventive embodiment the release bearing 2 is insured of very good lubrication. The rotating inner ring provides a strong centrifugal force which effectively distributes and feeds the lubricant to the rolling elements 21 so that during operation the rolling elements are continuously provided with lubricant. The lubricants which accumulate at the angular ring 25 are constantly pressed back into the bearing by the following lubricant fed by the rotating inner ring 14. By providing a predetermined crevice or space between the ring 25 and the counterring 26 a certain amount of lubricant is retained in this space and the cooperating elements become a very good slidable seal with very little friction.

The hydraulic release mechanism as seen in FIG. 4 is an embodiment which is particularly adaptable for clutches of motor vehicles wherein the clutch is arranged between the motor and the transmission so that a shaft extends through the release mechanism. The release mechanism is similar to that shown in FIG. 3 in that the inner and outer rings are formed from sheet metal parts and have inclined race surfaces bearing against the rolling elements which are also held in a cage. However, in this embodiment neither the inner ring 14c or the outer ring 12c have their central bores closed. The outer ring 12 has an axially extending skirt 28 which extends within the bore of the inner ring 14c so that the outer ring appears to surround and enclose the bearing assembly. In the embodiment of FIG. 4 the bellows 17c extends along the wall of the cylindrical housing portion 6c and substantially about the outer surface of the outer race ring and is rolled over an axially extending sleeve 29 through which the bellows 17c is clampingly fastened on its inner edge to the housing 1. This clamp is provided by forming the inner sleeve 29 with a bead 29a and radially extending outer edge 29b which engages over the inner edges of the rear housing portion 3c. Between the axially extending portion 28 of the outer ring 12c and the sleeve 29, as well as between the outer ring 12 and the cylindrical housing portion 6, a relatively wide annular space 30 is provided so that the bearing assembly 2 can be adjusted or moved in the radial direction. The pressure chamber in the housing is annular in nature and surrounds the inner sleeve. A tap is provided as in the previous cases for delivery of fluid pressure thereto. The rear face of the housing member 3c is open to permit a shaft from the motor or transmission to extend completely through the housing and the sleeve 29. The bearing assembly 2 is provided with seal means as in the previous example of FIG. 3.

Still another embodiment is set forth in FIG. 5 which will be observed as a variant of FIG. 3. In the example of FIG. 5 the release element 15 is formed as a cup-shaped member integral with the outer race ring 12d and forming the enclosing member for the race ring 12d radially within its outer periphery. In this instance the outer ring 12d forms the rotating race ring of the bearing while the inner race ring 12d is non-rotating. The non-rotating inner race ring 14d is provided with an inner covering plate 11d which is also integrally formed with it. The bellows 17d extends over the inner race ring 14d being clamped between the two portions of the housing 1d and between the spring pressure plate 18d and the cover member 11d. When the pressure chamber 10 formed between the housing portion 3d and the bellows 17 is supplied with a pressurized medium the inner ring 14 together with the integrally formed cover plate 11 slides to the right as seen in FIG. 5 so that it moves the outer ring 12 with which the operating element 15d is integral against the release lever of the clutch. The spring 19 which biases the pressure disc 18 serves to prestress the inclined bearing assembly 2 and insures that the balls 21 of the bearing assembly are constantly in contact with the race surfaces of both the inner ring 14d and the outer ring 12d. As seen in the upper portion of FIG. 5 the interior of the bearing assembly can be sealed by an annular ring 25 which is secured or fastened onto the edge of the inner ring 14 so as to form a contact free non-engaging seal similar to that shown in FIG. 3. A variant of this type of seal is shown in the lower portion of FIG. 5 wherein the angular annular ring 25 is press fit within the axially extending portion of the inner ring 14d and a cooperating axially outer seal ring 31 is press fit over the outer surface of the outer ring 12d so as to be opposed to but spaced from the ring 25. The rings 25 and 31 provide a non-contacting non-engaging seal for the bearing assembly. In both instances the function of the seals and of the self-relubrication and pressure lubrication of the bearing assembly are the same as in the embodiment of FIG. 3.

In FIG. 6 a hydraulic release mechanism is shown which is similar to that of FIG. 1 in structure but wherein the inner ring 14 is non-rotating while the outer ring 12 does rotate. As in the examples of FIG. 1 and 2 the bearing assembly 2 is formed of an enlarged ball bearing having annular grooves in solidly machined race members and wherein the pressure medium is admitted into a chamber 10 to act against the bellows member 17 which is supported by the cover plate 11. The cover plate in this instance abuts against the inner ring 14 and its radially outwardly extending portions are spaced from but surround the outer ring 12 with a sufficiently enlarged space 16 to permit the outer ring 12 to be axially free with respect to the cover plate 11. In this manner the outer ring 12 can freely rotate. The operating element 15 is stamped or press fit from sheet metal material and has a radially enlarged skirt which extends axially over the outer edge of the outer race ring 12 to which it is fastened for conjoint movement.

In the embodiment of FIG. 7 the housing 1 takes another form which structure is obvious from the drawing and which requires no explanation. The housing 1 is also a two part structure which is completely annular in nature. In this embodiment the bellows 17f is also annular and is clamped between the outer and inner frontal faces of the rear and front portions of the housing 1. The bearing assembly 2 is a conventional annular grooved ball bearing which is located axially to the front of the housing 1. The inner race ring 14f is non-rotating and is provided with an annular piston member 32 which is secured thereto and extends into the cylindrical portion of the housing 1 to abut against the bellows member 17e. The annular piston member 32 thus takes the place of the cover plate 11 which supports the bellows. A spiral spring 19f abuts against the housing 1 and against a shoulder of the piston 32 to bias the bearing assembly 14f and piston 32 in its outwardly direction as seen in the figure going to the right. The central bore of the bearing assembly 2 and the housing 1 is open at both ends for receipt of an operating lever or shaft to extend therethrough. The operating element 15 is not shown in FIG. 7 but is suitably fastened to the rotating race ring 12f. The release mechanism of FIG. 7 is in principle similar to that shown previously in FIG. 4 although here the bearing assembly 2 is a radial grooved ball bearing having solid machined inner and outer rings respectively.

It will be seen from the foregoing that each of the embodiments of the present invention provides a release mechanism for automotive clutches wherein the bearing assembly is mounted to be floating with respect to the housing with which it is located so that it has both axial and radial play of sufficient depth and dimension so that it is self-aligning and self-adjustable. In each of the embodiments the floating mount is provided through the use of a flexible and/or elastic bellows member which seals the pressure chamber in the housing and simultaneously forms the piston means for movement of the bearing assembly. Various modifications, changes and variants have been shown. Others will be obvious to those skilled in this art. It is intended therefore that the present disclosure be illustrative only of the present invention and not limiting of its scope.

What is claimed:

1. A hydraulic release mechanism for automotive clutches and the like comprising a cylindrical housing open at one end, a bearing assembly located within said housing at said open end and comprising a non-rotating outer race ring having a cylindrical surface spaced from said housing, a rotatable race ring adapted to be connected to an operating element for said clutch and a plurality of rolling elements arranged therebetween, a cover plate abutting the pressure end of said bearing, a pressure plate mounted over said cover, means for securing said cover and pressure plates together, and spring means interposed between said pressure plate and the opposing wall of said housing, a flexible elastomeric wall secured to said bearing assembly between said pressure plate and said cover plate and to said housing and being folded within the space between said outer race ring and said housing to engage the cylindrical surfaces of said housing and said nonrotating race ring for axially slidable movement and radially floating movement with respect thereto, said wall defining with said housing a chamber for receiving fluid under pressure, the force of which is transmitted through the end of the nonrotating race ring, said rolling elements, and rotating race ring to said clutch operating element.

2. The hydraulic release mechanism according to claim 1 including means extending radially from said pressure plate into an axial slot formed in the housing for limiting the angular deflection of said bearing assembly.

3. A hydraulic release mechanism for automotive clutches and the like comprising a cylindrical housing open at one end, a bearing assembly located within said housing at said open end and comprising a non-rotating outer race ring having a cylindrical surface spaced from said housing, a rotatable race ring and a plurality of rolling elements arranged therebetween, a clutch operating element unitarily formed integrally with said rotatable race ring, a flexible elastomeric wall secured to said bearing assembly and to said housing and being folded within the space between said outer race ring and said housing to engage the cylindrical surfaces of said housing and said non-rotating race ring for axially slidable movement and radially floating movement with respect thereto, said wall defining with said housing a chamber for receiving fluid under pressure, the force of which is transmitted through the end of the non-rotating race ring, said rolling elements, and rotating race ring to said clutch operating element.

4. The hydraulic release mechanism according to claim 3 including non-contacting seal means arranged between the rotating ring and the non-rotating ring on the side adjacent the operating elements.

5. The hydraulic release mechanism according to claim 3 wherein the means for mounting said bearing assembly includes a piston member secured to said bearing assembly, said piston member extending within said housing, and provided with flexible seal means.

6. The hydraulic release mechanism according to claim 3 wherein said piston member is annular.

* * * * *